(12) United States Patent
Erden et al.

(10) Patent No.: US 7,688,535 B2
(45) Date of Patent: Mar. 30, 2010

(54) EXTRACTING POSITION INFORMATION USING USER DATA

(75) Inventors: Mehmet Fatih Erden, Pittsburgh, PA (US); Rene Johannes Marinus van de Veerdonk, Wexford, PA (US); Alexei Hiram Sacks, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 281 days.

(21) Appl. No.: 11/850,214

(22) Filed: Sep. 5, 2007

(65) Prior Publication Data

US 2009/0059412 A1 Mar. 5, 2009

(51) Int. Cl.
*G11B 20/14* (2006.01)
(52) U.S. Cl. ............... 360/40; 360/48; 360/75; 360/77.01
(58) Field of Classification Search ............ None
See application file for complete search history.

(56) References Cited

U.S. PATENT DOCUMENTS

| | | | |
|---|---|---|---|
| 5,568,331 A | 10/1996 | Akagi et al. | |
| 6,064,541 A | 5/2000 | Sasamoto et al. | |
| 6,643,082 B1 | 11/2003 | Belser | |
| 6,738,207 B1 | 5/2004 | Belser et al. | |
| 6,751,035 B1 | 6/2004 | Belser | |
| 6,937,421 B2 * | 8/2005 | Rubin et al. | 360/77.01 |
| 6,977,108 B2 * | 12/2005 | Hieda et al. | 428/64.2 |
| 7,019,924 B2 | 3/2006 | McNeil et al. | |
| 7,046,476 B1 | 5/2006 | Albrecht et al. | |
| 2004/0037202 A1 * | 2/2004 | Brommer et al. | 369/94 |
| 2007/0258161 A1 * | 11/2007 | Richter et al. | 360/48 |
| 2008/0002269 A1 * | 1/2008 | Sakurai et al. | 360/48 |

FOREIGN PATENT DOCUMENTS

JP 2000215441 A * 8/2000

* cited by examiner

*Primary Examiner*—Jason C Olson
(74) *Attorney, Agent, or Firm*—Leanne, Taveggia, Farrell, Westman, Champlin & Kelly, P.A.

(57) ABSTRACT

A method is disclosed for determining position information of a transducer. At least a first code and a second code are chosen. The first code has different characteristics than the second code. User data written to a first sub-track is encoded with the first code and user data written to a second sub-track is encoded with the second code. The first code read from the first sub-track is obtained and the second code read from the second sub-track is obtained. Position information of the transducer is extracted from the obtained characteristics of the first code and the obtained characteristics of the second code.

19 Claims, 11 Drawing Sheets

EXTRACTING POSITION INFORMATION USING USER DATA

FIELD OF THE DISCLOSURE

The present disclosure relates generally to data storage media, and more particularly but not by limitation to the extraction of position information from data storage media.

BACKGROUND

Data storage systems typically store information on surfaces of storage media. When data are stored on a storage medium they are generally stored in a set of data tracks. The tracks on the medium surface are typically divided into sectors. Sectors are the basic units of data storage on a medium surface. A sector is a storage segment along the length of a track.

User data are stored in data sectors, while servo data are stored in servo sectors that are inserted between data sectors along each track. Information that is stored in servo sectors is utilized by a servo system in the data storage system. Conventional servo systems extract head position information from the servo sectors such that the head is positioned at or very close to a track center of a track before user data are written to a data sector or read back from the data sector.

Conventional data storage systems assume that a head will not significantly stray from the center or approximately near the center of a track from one servo sector to the next. Then, the data storage system processes the user data in the data sectors assuming that the head position is correct. Such an assumption requires tight constraints on data fields within each servo sector.

SUMMARY

Methods are disclosed for determining position information of a transducer and positioning a transducer on a data track. To determine position information, at least a first code and a second code are chosen. The first code has different spectral properties than the second code. User data written to a first sub-track is encoded with the first code and user data written to a second sub-track is encoded with the second code. Characteristics of the first code read from the first sub-track are obtained and characteristics of the second code read from the second sub-track are obtained. Position information of the transducer is extracted from the characteristics obtained from the first code and the characteristics obtained from the second code.

To position the transducer on the data track, user data are encoded with a first code that is written to a first sub-track and user data are encoded with a second code that is written to a second sub-track. The first code has a first spectrum and the second code has a second spectrum. The first spectrum is obtained from the first sub-track and the second spectrum is obtained from the second sub-track. The transducer is positioned at least substantially near a center of the data track by comparing the first spectrum of the first code to the second spectrum of the second code.

A recording system is disclosed that includes media having data tracks that store user data in data sectors. Each data track of each data sector includes at least a first sub-track and a second sub-track. The system includes a transducer configured to write user data having a first code to the first sub-track and to write user data having a second code to the second sub-track. A controller positions the transducer at least substantially near a center of each data track based on obtaining the first spectrum of the first code and the spectrum of the second code.

Other features and benefits that characterize embodiments of the present disclosure will be apparent upon reading the following detailed description and review of the associated drawings.

BRIEF DESCRIPTION OF THE DRAWINGS

FIG. 11-1 is a plot illustrating read back signal samples of redundant bits illustrated in FIG. 10.

FIG. 11-2 is a plot illustrating extracted position information as a function of cross-track distance based on the samples illustrated in FIG. 11-1.

FIGS. 13-1 through FIG. 13-4 are plots illustrating extracted position information and their mean and variations as a function of cross-track distance for different read elements having different sensitivities, different chosen amount of redundant bits, a normalized density of 2 and the method of determining position information as illustrated in FIGS. 6 and 7.

DETAILED DESCRIPTION OF ILLUSTRATIVE EMBODIMENTS

Figure 1:
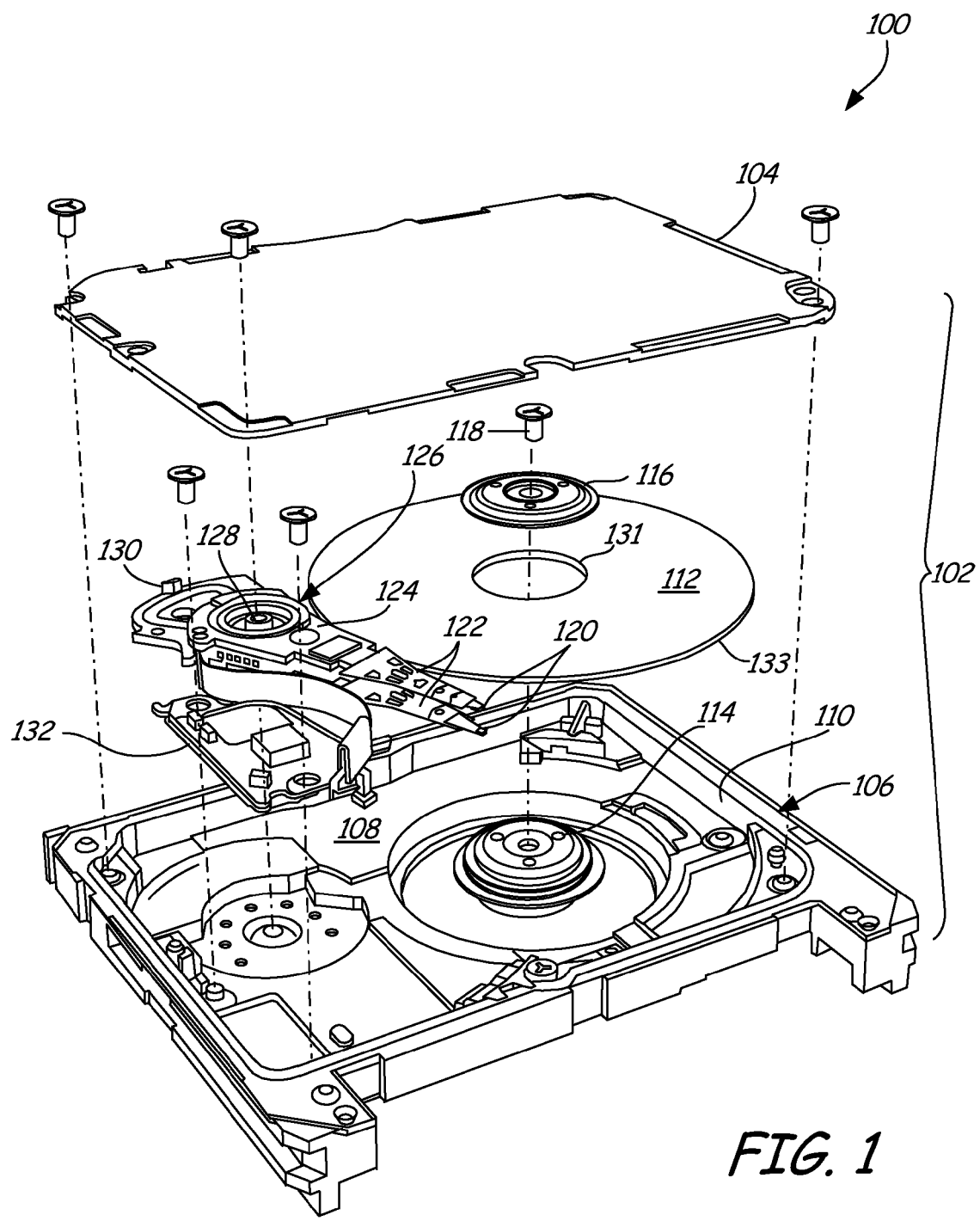
FIG. 1 is a perspective view of a data storage system.

FIG. 1 is an exploded perspective view of a data storage system 100 in which embodiments of the disclosure are useful. Disc drives are common data storage systems that have storage media. However, one or more embodiments of the disclosure are also useful in other types of systems that include storage media.

Data storage system 100 includes a housing 102 having a cover 104 and a base 106. As shown, the cover 104 attaches to base 106 to form an enclosure 108 that is enclosed by a perimeter wall 110. The components of data storage system 100 are assembled to base 106 and are enclosed in enclosure 108 of housing 102. As shown, data storage system 100 includes a media in the form of a disc 112 having magnetic medium on one or both of its surfaces. Although FIG. 1 illustrates a single disc 112, those skilled in the art should understand that more than one disc can be used in disc drive 100. Disc 112 stores information in a plurality of data tracks and is mounted on a spindle motor assembly 114 by a disc clamp 116 and pin 118. Spindle motor assembly 114 rotates disc 112 causing its data surfaces to pass under respective air bearing transducers. Each surface of disc 112 has an associated transducer 120, which communicates with the surface(s) of the disc.

In the example shown in FIG. 1, transducer 120 is supported by a suspension assembly 122, which is, in turn, attached to track accessing arm 124 of an actuator mechanism 126. Actuator mechanism 126 is rotated about a shaft 128 by a voice coil motor 130, which is controlled by servo control circuitry within internal circuit 132. Voice coil motor (VCM) 130 rotates actuator mechanism 126 to position transducer 120 relative to desired data tracks, between a disc inner diameter 131 and a disc outer diameter 133.

Figure 2:
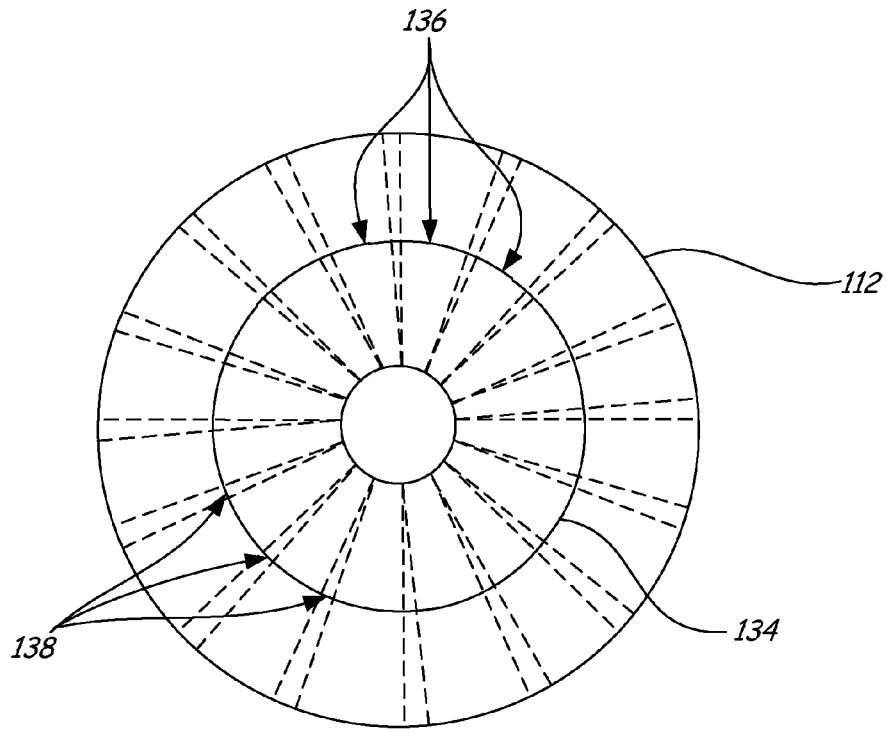
FIG. 2 illustrates a top plan view of the storage medium illustrated in FIG. 1.

FIG. 2 illustrates a top schematic view of the disc 112 illustrated in FIG. 1. Disc 112 has a plurality of substantially concentric circular tracks of which data track 134 is illustrated. Each track, including data track 134, is subdivided into a plurality of sectors. Sectors are the basic unit of data storage in disc 112 and include small sections of a track that are bounded on two sides and on another side by the perimeter of the circle that defines the track. In typical embodiments, sectors form small arcs along data tracks. However, it should be noted that data track 134 in FIG. 2 is illustrated for exemplary purposes. Data tracks are not limited to concentric circular tracks. In particular, data tracks can be defined as any type of grid pattern on any type of storage medium which is subdivided into data sectors. In FIG. 2, sectors on disc 112 include data sectors 136 and servo sectors 138. Each type of sector is identified and located at various positions on disc 112.

Each servo sector 138 can include positioning information that is pre-written onto disc 112 such that the transducers on the suspension can easily locate user data. Each servo sector 138 can also include at least a servo address mark (SAM) or a servo index mark (SIM) and a gray code value that can encode a track identifier and a sector identifier associated with each track. The SAM or SIM and track identifier identify a rough location of the sector. In between each servo sector 138 is the data sector region, which includes user data.

In conventional magnetic recording, both user data written in data sectors and servo information written in servo sectors are written on granular media. However, user data written in data sectors and servo information written in servo sectors can also be written on bit patterned media (BPM). BPM includes dedicated locations of discrete sets of magnetic material for writing of information. A single bit of information is written on each dedicated location.

Figure 3:
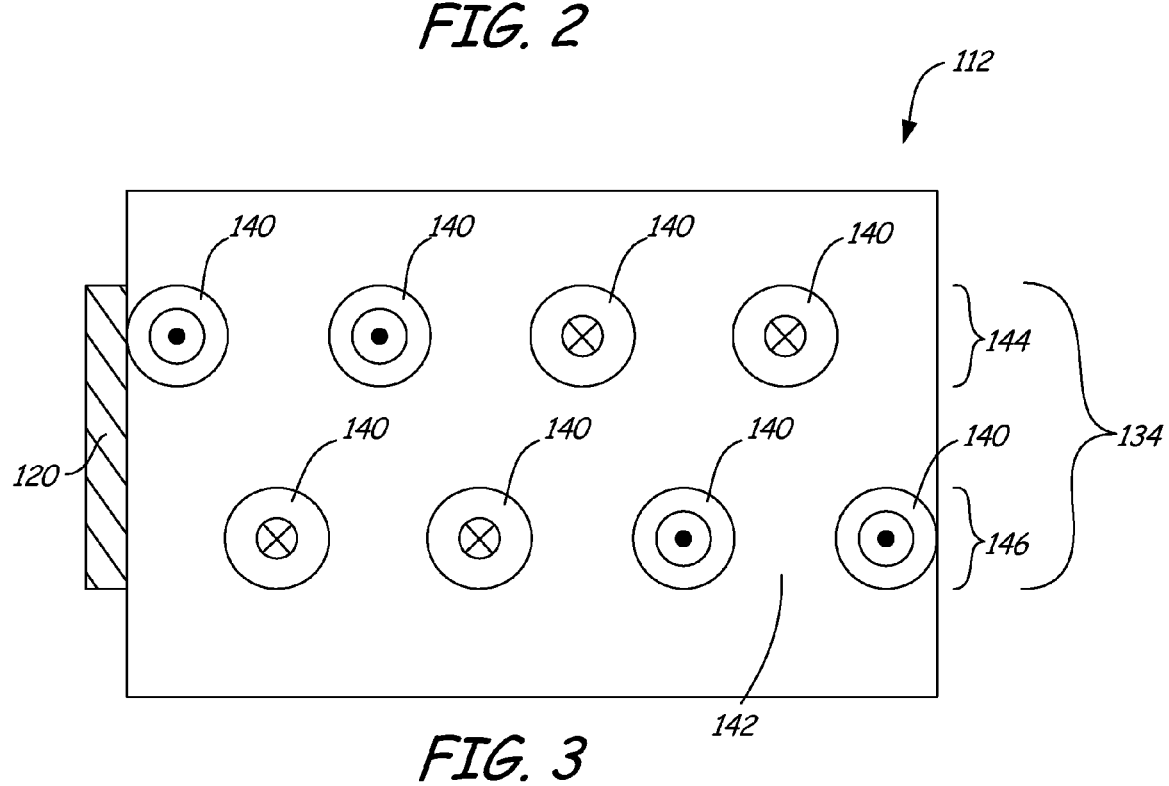
FIG. 3 is a simplified illustration of a magnified portion of a data track on the storage medium illustrated in FIGS. 1 and 2.

FIG. 3 is a top schematic illustration of a portion of the data track 134 on disc 112, wherein disc 112 is bit patterned media. As illustrated, dedicated locations on disc 112 are bit islands 140 and are surrounded by a region 142 that is absent of data. While bit islands 140 are magnetic, the surrounding region 142 may or may not be magnetic. The pattern of media on disc 112 illustrated in FIG. 3 shows magnetization orientations on bit islands 140. In FIG. 3, magnetization orientations are illustrated as up (dots) and down directions (crosses). Up magnetization orientations are coming out of the page and down magnetization orientations are going into the page. Such up and down orientations show that disc 112 was recorded using perpendicular recording. However, it is also possible to record magnetization orientations on disc 112 using longitudinal recording. The magnetization orientations from longitudinal recording would be left and right orientations. In FIG. 3, if we were to assign all "up" magnetization orientations as a 1 and all "down" magnetization orientations as a −1, then transducer 120 will read magnetization levels corresponding to the bits {1, −1, 1, −1, −1, 1, −1, 1}.

The pattern of media on disc 112 illustrates a staggered pattern. In staggered pattern bit patterned media, information bits are written to and read from a plurality of sub-tracks in either a single write operation or a single read operation. Although FIG. 3 illustrates a first sub-track 144 and a second sub-track 146, it should be understood that multiple amounts of sub-tracks can be located on data track 134. As illustrated, on sub-tracks 144 and 146, bit islands 140 are staggered circumferentially and radially from each other such that only one bit island 140 is directly under a portion of transducer 120 at any given point in time.

Embodiments of the disclosure include extraction of position information on bit patterned media using user data stored in data sectors on a disc to supplement the use of servo information stored in servo sectors as is done in conventional data magnetic recording. Embodiments can allow for exclusive use of the data sector derived position information without a need for servo sectors. Embodiments of the disclosure include the extraction of location of bit islands (e.g., bit islands 142) on bit patterned media relative to the transducer (e.g., transducer 120) by choosing the patterns that are written to the bit islands. The extracted position information is used to locate the transducer at or close to the center of a data track. The following description of embodiments explain in detail the process and system utilized in extracting position information from user data stored in data sectors on a media.

Figure 4:
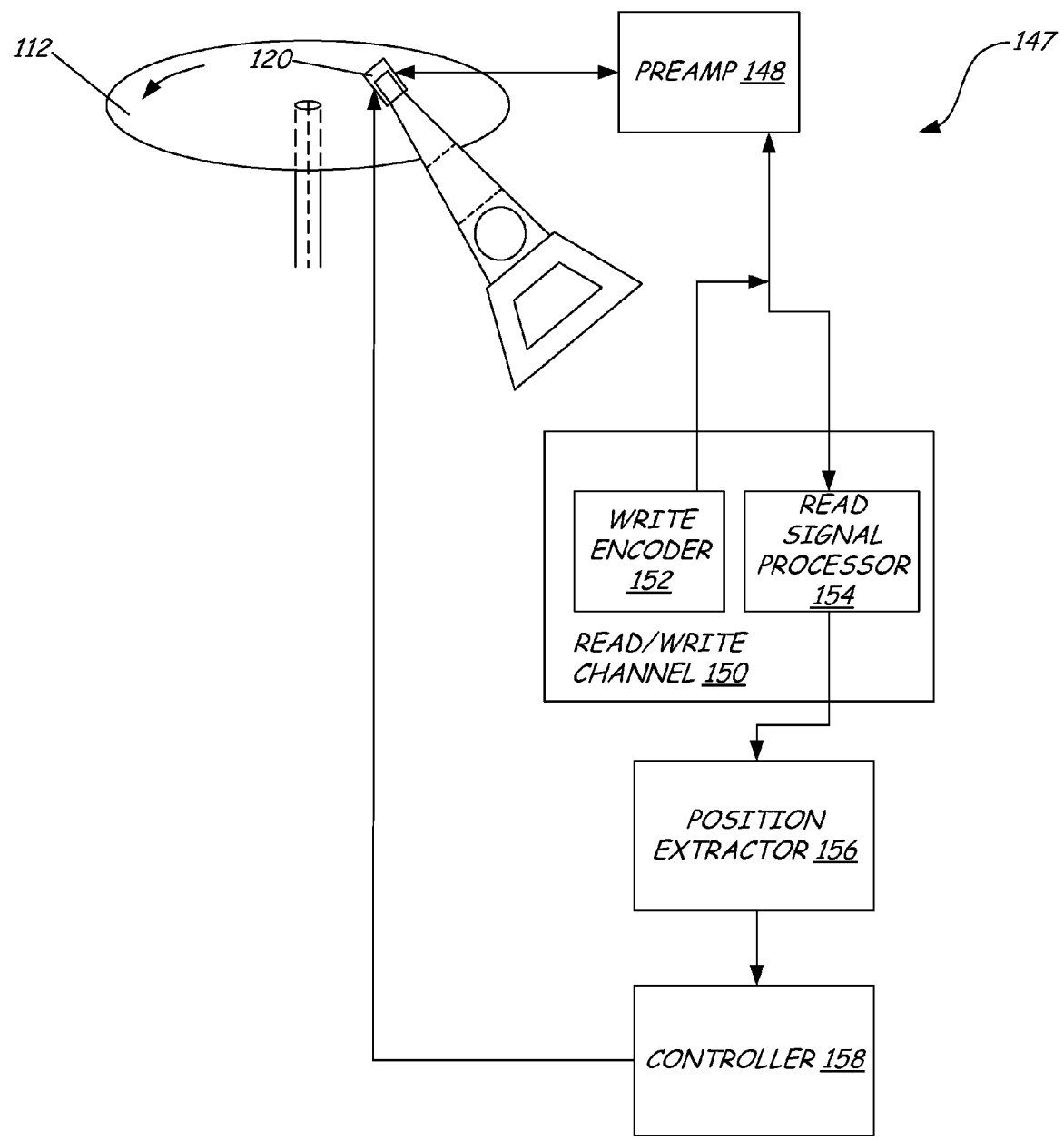
FIG. 4 illustrates a simplified block diagram of a recording system.

FIG. 4 is a simplified block diagram of a magnetic recording system 147 in a disc drive in accordance with embodiments of the disclosure. Magnetic recording system 147 includes disc 112 and the associated transducer 120 including both a read element and a write element. As illustrated in FIG. 4, magnetic recording system 147 includes a preamplifier (preamp) 148 for generating a write signal applied to transducer 120 during a write operation, and for amplifying a read signal emanating from transducer 120 during a read operation.

Figure 5:
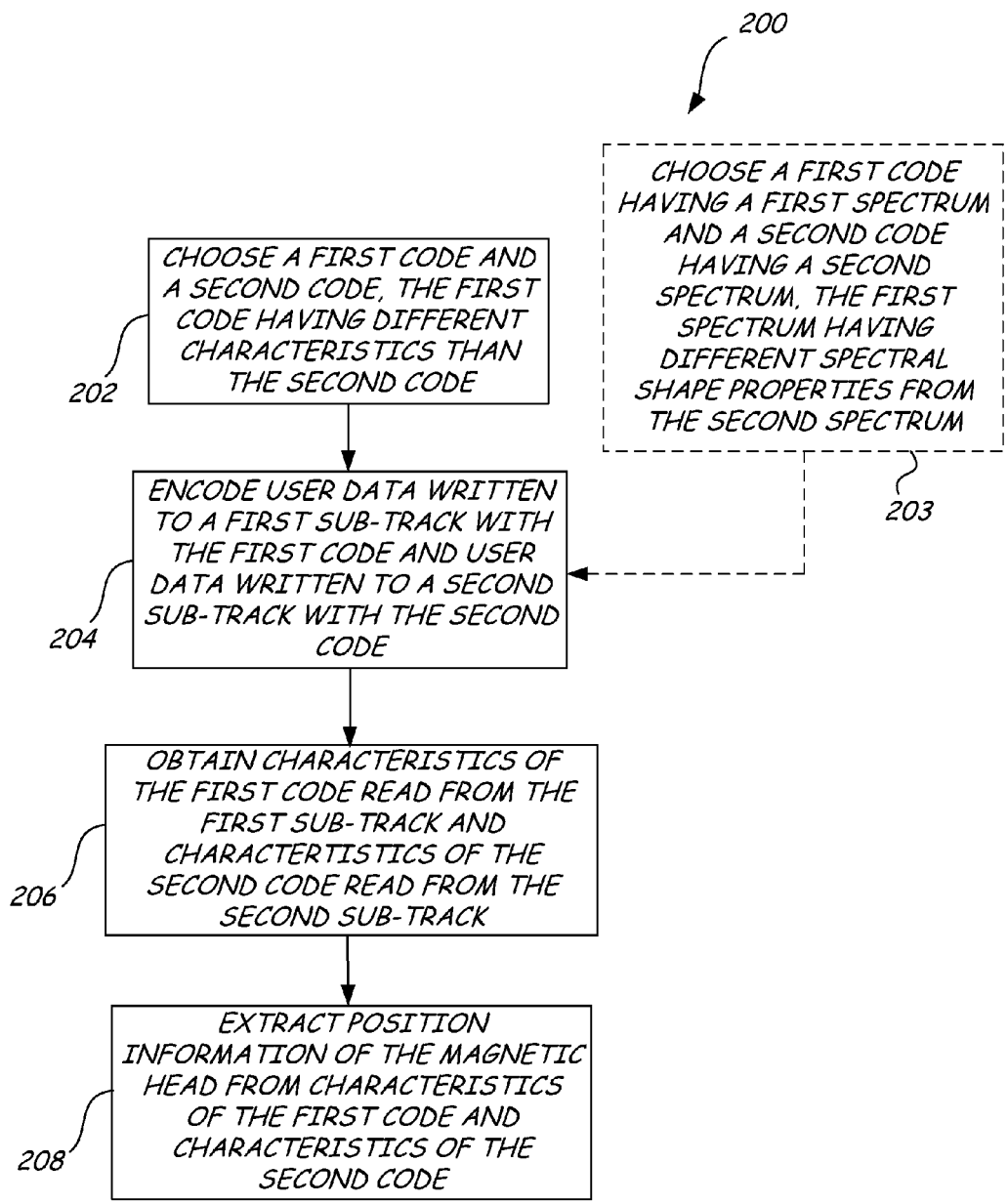
FIG. 5 is a flowchart illustrating a method of determining the position of a transducer on a data track.

FIG. 5 is a simplified flowchart 200 illustrating a method of determining position of transducer 120 on a data track in accordance with embodiments of the disclosure and in accordance with the block diagram illustrated in FIG. 4. Although not specifically illustrated in FIG. 4, a read/write channel 150 receives user data during a write operation. The method begins at block 202 where a first code and a second code are chosen. The first code has different characteristics or properties than the second code. For example, characteristics or properties of the first code and the second code can include spectral shape (or spectrum) characteristics or properties. Therefore, block 203 can alternatively be used in place of block 202 where a first code having a first spectrum and a second code having a second spectrum are chosen. At block 204, the first code is chosen for user data that is to be written to first sub-track 144 (FIG. 3) of disc 112 and the second code is chosen for user data that is to be written to second sub-track 146 (FIG. 3) of disc 112. Also at block 204, user data are encoded with the first code that is then written to the first sub-track 144 and user data are encoded with the second code that is then written to the second sub-track 146. As illustrated in FIG. 4, read/write channel 150 encodes write data for first sub-track 144 and encodes write data for second sub-track 146 with write encoder 152. During a write operation, read/write channel 150 provides the encoded write data for both first sub-track 144 and second sub-track 146 to preamplifier 138 to generate the write signal for writing to disc 112 using transducer 120.

During a read operation, read/write channel 150 processes a read signal magnified by preamp 138 with a read signal processor 154 to obtain, detect and decode user data recorded on disc 112. At block 206, characteristics of the first code read from the first sub-track are obtained and characteristics of the second code read from the second sub-track are obtained. The decoded data, as illustrated in FIG. 4, is provided to a position extractor 156. Position extractor is able to extract the position information of transducer 120 based on the decoded data. At block 208, position information is extracted from the first code obtained from read signal processor 154 and the second code obtained from read signal processor 154. Position extractor is configured to compare the first code to the second code to then transmit the extracted position information to controller 158. Controller 158 is configured to control the position of transducer 120 based on the position information extracted by position extractor 156. The desired position of transducer 120 should be at or substantially near the center of a data track for reading user data.

Figure 6:
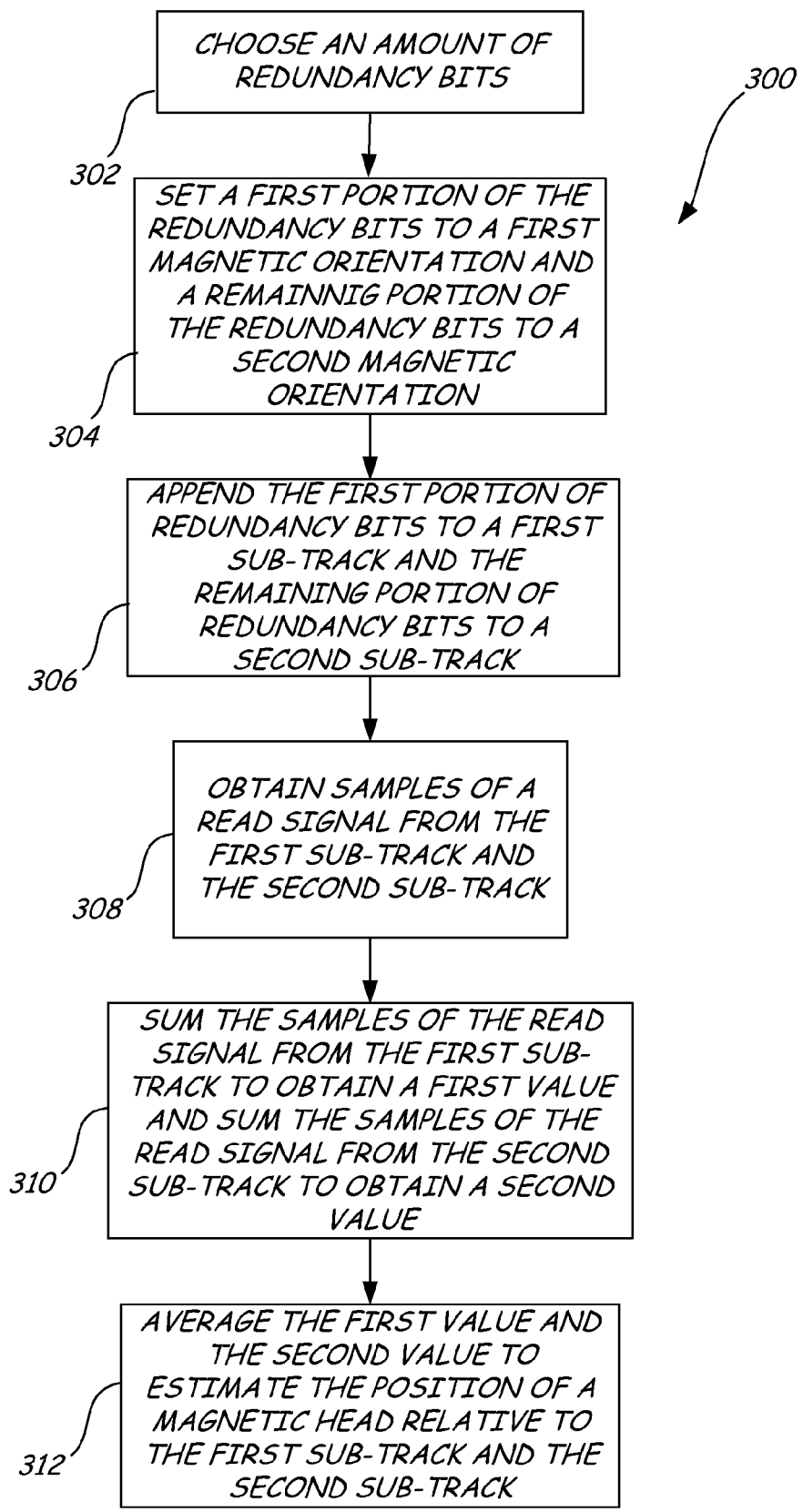
FIG. 6 is a flowchart illustrating an example implementation of the method of determining the position of a transducer on a data track.
Figure 7:
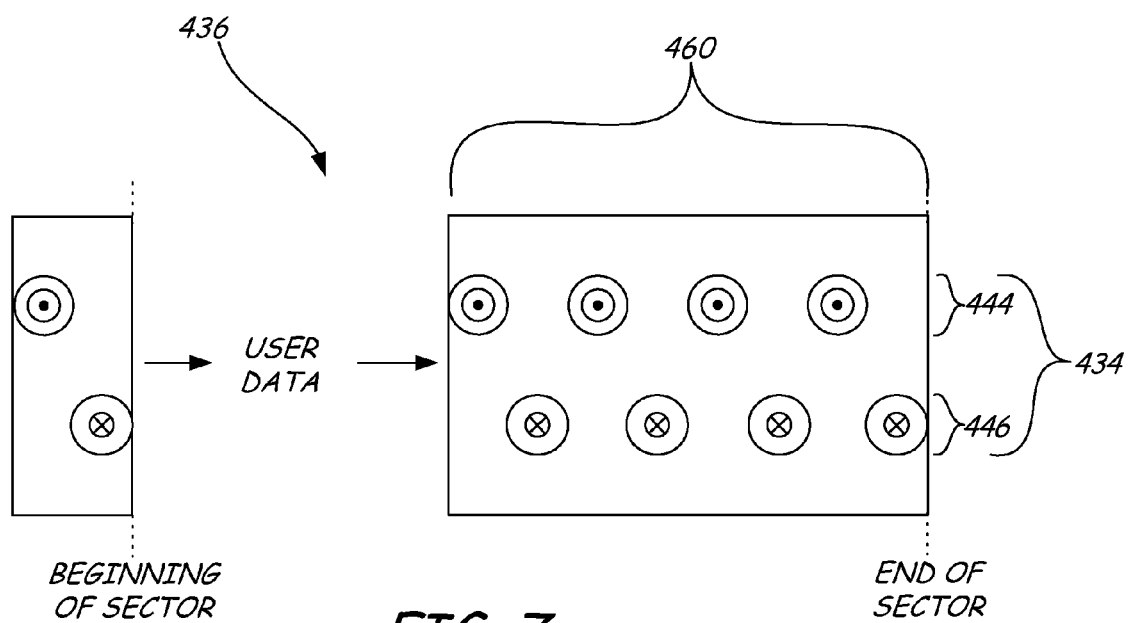
FIG. 7 is an example data track used in the example implementation of FIG. 6.

FIGS. 6 and 7 illustrate an example implementation of the method of determining the position information of a transducer as discussed above. FIG. 6 is an example flowchart 300 illustrating the method of determining the position of a transducer on a data track 434 and FIG. 7 is an example data sector 436 used in the method illustrated in FIG. 6.

In the example implementation of the method of determining the position information of a transducer as illustrated in FIGS. 6 and 7, the first sub-track is encoded with a first code, the second sub-track is encoded with a second code and values of the redundant bits at the end of each data sector are adjusted, such as in data sector 436 in FIG. 7. Examples of redundant bits can include parity bits or other types of error correction and error detection information and/or can also enhance position information extraction. Although not illustrated in FIG. 7, the redundant bits do not necessarily have to be at the end of each data sector 436 and can instead be located at the beginning of each data sector or between user data in each data sector. In addition, redundant bits do not have to be inserted in every data sector of a data track. Certain data sectors can be selected for insertion of redundant bits by analyzing the variation in repeatable run-out (RRO) values along the data sectors. Inserting redundant bits in only select data sectors of a data track yields better format efficiency.

At block 302, an amount of bits are chosen as redundancy bits 460. The amount is an even number. For example, the selected amount of redundancy bits 460 can be 8 (as illustrated in FIG. 7). However, although not illustrated in FIG. 7, the example data sector can have an amount of redundancy bits 460 of 16, 32 or any other selected even number. In addition, the amount of redundancy bits should be chosen based on the noise in the recording system. If there is high noise, the amount of redundancy bits should be higher than if there is low noise. Choosing a larger amount of redundancy bits in a higher noise system reduces overall format efficiency.

At block 304, a first portion of redundancy bits are set to a first magnetic orientation and a second portion of redundancy bits are set to a second magnetic orientation. As illustrated in FIG. 7, the first portion of redundancy bits is half of the total amount of redundancy bits and the second portion of redundancy bits is the other half of the total amount of redundancy bits. In addition, the first portion of redundancy bits are "up" magnetization orientations equivalent to a value of 1 and the second portion of redundancy bits are "down" magnetization orientations equivalent to a value of −1. At block 306, the first portion of redundancy bits are appended to an end of a first sub-track 444 on data sector 436 and the second portion of redundancy bits are appended to an end of a second sub-track 446 on data sector 436. As discussed earlier, although FIG. 7 illustrates data track 436 having two sub-tracks, it should be noted that more than two sub-tracks can be used on a given data track. In addition, redundancy bits can be appended to other locations of data sector 436 (e.g., at the beginning of the data sector or between user data in the data sector). Such appended bits mean that a transducer, such as transducer 120 of FIGS. 3 and 4, will read magnetization levels corresponding to the bits {1, −1, 1, −1, 1, −1, 1, −1}.

After the amount of redundancy bits are chosen and appended to data sector 436, a read signal corresponding to the redundancy bits at the end of data sector 436 (or at other locations in data sector 436) can be received by a read/write channel, such as read/write channel 150 of FIG. 4. At block 308, samples of the read signal corresponding to the redundancy bits are obtained from first sub-track 444 and second sub-track 446. Although not particularly illustrated in FIG. 4, the samples of the read signal from first sub-track 444 and second sub-track 446 are obtained at the output of an analog-to-digital converter. At block 310, the samples of the read signal from first sub-track 444 are summed to obtain a first value ($r_{first}$) and the samples of the read signal from the second sub-track 446 are summed to obtain a second value ($r_{second}$). At block 312, the first value and the second value are averaged to estimate the position of the transducer relative to first sub-track 444 and second sub-track 446. Such calculation is as follows:

$$r_{average} = \frac{(r_{first} + r_{second})}{2}$$

Figure 9:
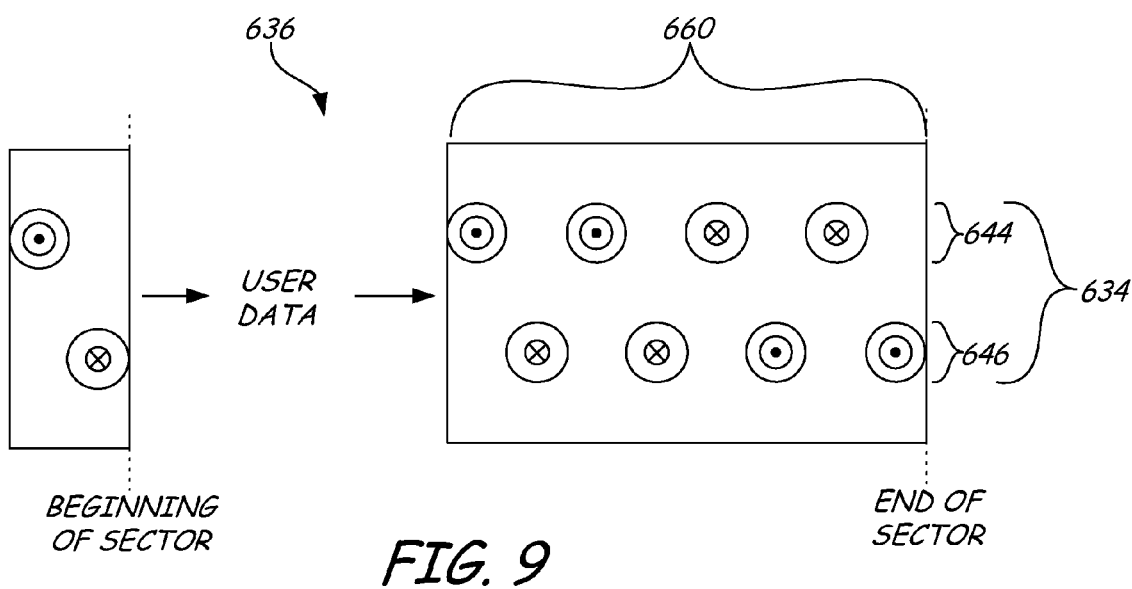
FIG. 9 is an example data track used in the example implementation of FIG. 8.
Figure 8:
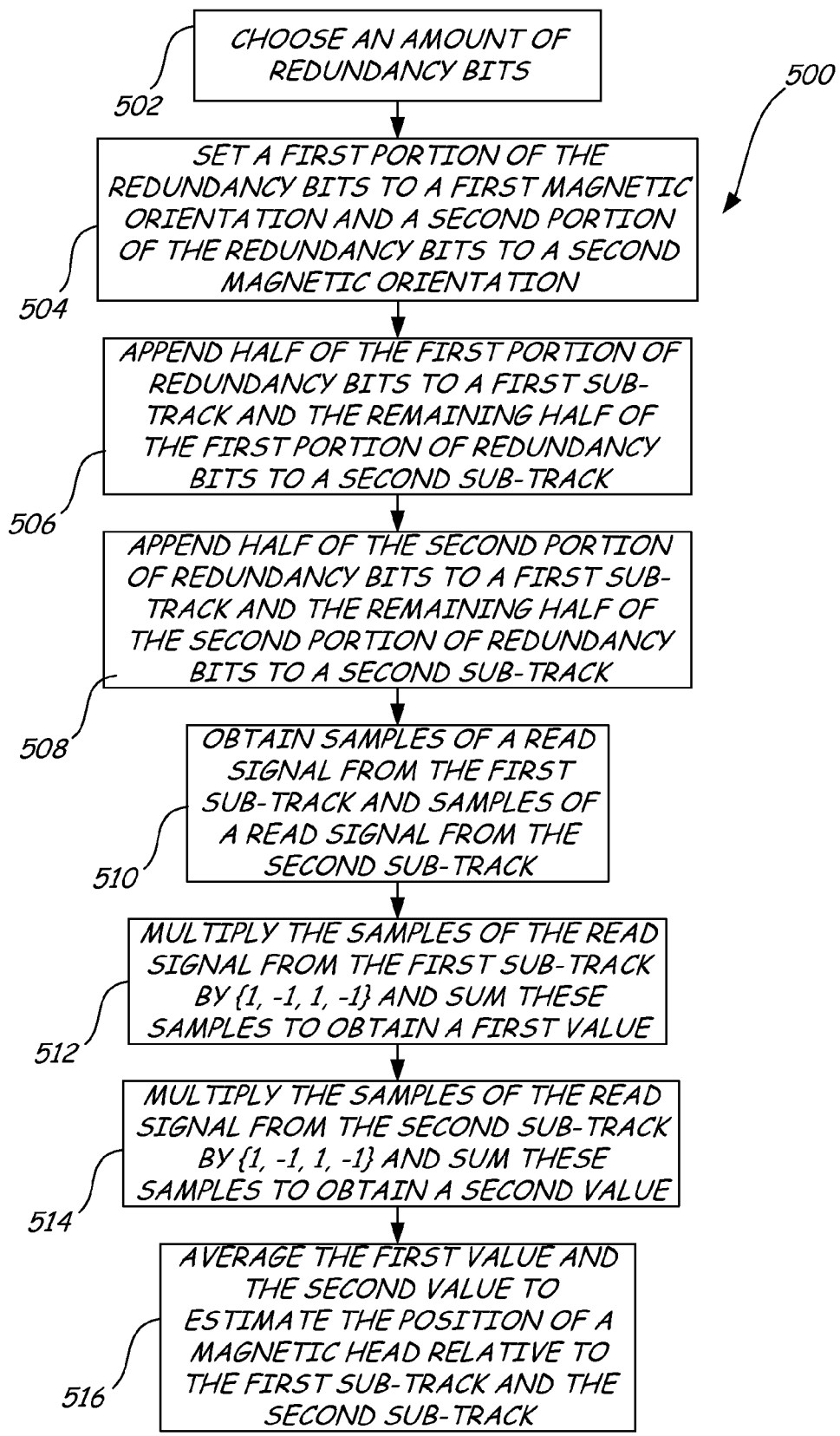
FIG. 8 is a flowchart illustrating another example implementation of the method of determining the position of a transducer on a data track.

FIGS. 8 and 9 illustrate another example implementation of the method of determining the position information of a transducer as discussed above. FIG. 8 is an example transducer on data track 634 and FIG. 9 is an example data sector 636 used in the method illustrated in FIG. 8. The example illustrated in FIGS. 6 and 7 requires that the recording system have no high-pass pole or high-pass filter in the system. Therefore, direct current (DC) read signals are needed to extract position estimation. However, the example illustrated in FIGS. 8 and 9 takes into account recording systems that have high-pass poles or high-pass filters in the preamplifier.

In the example implementation of the method of determining position information of a transducer as illustrated in FIGS. 8 and 9, the first sub-track is encoded with a first code, the second sub-track is encoded with a second code and the values of redundant bits at the end of each data sector are adjusted, such as data sector 636 in FIG. 9. Although not illustrated in FIG. 7, the redundant bits do not necessarily have to be at the end of each data sector 436 and can instead be located at the beginning of each data sector or between user data in each data sector. In addition, redundant bits do not have to be inserted in every data sector of a data track. Certain data sectors can be selected for insertion of redundant bits by analyzing the variation in repeatable run-out (RRO) values along the data sectors. Inserting redundant bits in only select data sectors of a data track yields better format efficiency.

At block 502, an amount of bits are chosen as redundancy bits (i.e., parities) 660. The amount is an even number. For example, the selected amount of redundancy bits 660 can be 8 (as illustrated in FIG. 9). However, although not illustrated in FIG. 9, the example data sector can have an amount of redundancy bits 660 of 16, 32 or any other selected even number. In addition, the amount of redundancy bits should be chosen based on the noise in the recording system. If there is high noise, the amount of redundancy bits should be higher than if there is low noise. Choosing a larger amount of redundancy bits in a higher noise system reduces overall format efficiency.

At block 504, a first portion of redundancy bits are set to a first magnetic orientation and a second portion of the redundancy bits are set to a second magnetic orientation. Unlike the example illustrated in FIGS. 6 and 7, the example illustrated in FIGS. 8 and 9 chooses the magnetization of the redundancy bits to accommodate the use of conventional preamp architectures having high pass poles or high-pass filters. The redundancy bits are chosen such that the frequency of the read back signal corresponds with bits that are within the passband of the preamplifier, and the phase of the plurality of different sub-tracks are arranged to differentiate one from the other.

As illustrated in FIG. 9, the first portion of redundancy bits is half of the total amount of redundancy bits and the second portion of redundancy bits is the other half of the total amount of redundancy bits. In addition, the first portion of redundancy bits are "up" magnetization orientations equivalent to a value of 1 and the second portion of redundancy bits are "down" magnetization orientations equivalent to a value of −1. At block 506, half of the first portion of redundancy bits are appended to an end of a first sub-track 644 on data sector 636 and the other half of the first portion of redundancy bits are appended to an end of a second sub-track 646 on data sector 636. At block 508, half of the second portion of redundancy bits are appended to an end of first sub-track 644 on data sector 636 and the other half of the first portion of redundancy bits are appended an end of second sub-track 646 on data sector 636. As discussed earlier, although FIG. 9 illustrates data track 636 having two sub-tracks, it should be noted that more than two sub-tracks can be used on a given data track. In addition, redundancy bits can be appended to other locations of data sector 636 (e.g., at the beginning of the data sector or between user data in the data sector). Such appended bits mean that a transducer, such as transducer 120 of FIGS. 3 and 4, will read magnetization levels corresponding to the bits {1, −1, 1, −1, −1, 1, −1, 1}.

After the amount of redundancy bits are chosen and appended to data sector 636, a read signal corresponding to the redundancy bits at the end of data sector 636 (or at other location in data sector 636) can be received by a read/write channel, such as read/write channel 150 of FIG. 4. At block 510, samples of the read signal corresponding to the redundancy bits are obtained from first sub-track 644 and second sub-track 646. Although not particularly illustrated in FIG. 4, the samples of the read signal from first sub-track 644 and second sub-track 646 are obtained at the output of an analog-to-digital converter. At block 512, the samples of the read signal from first sub-track 644 are multiplied by a sequence {1, −1, 1, −1} and then these samples are summed to obtain a first value ($r_{first}$). At block 514, the samples of the read signal from the second sub-track 646 are multiplied by the sequence {1, −1, 1, −1} and then these samples are summed to obtain a second value ($r_{second}$). At block 516, the first value and the second value are averaged to estimate the position of the transducer relative to first sub-track 644 and second sub-track 646. Such calculation is as follows:

$$r_{average} = \frac{(r_{first} + r_{second})}{2}$$

Figure 10:
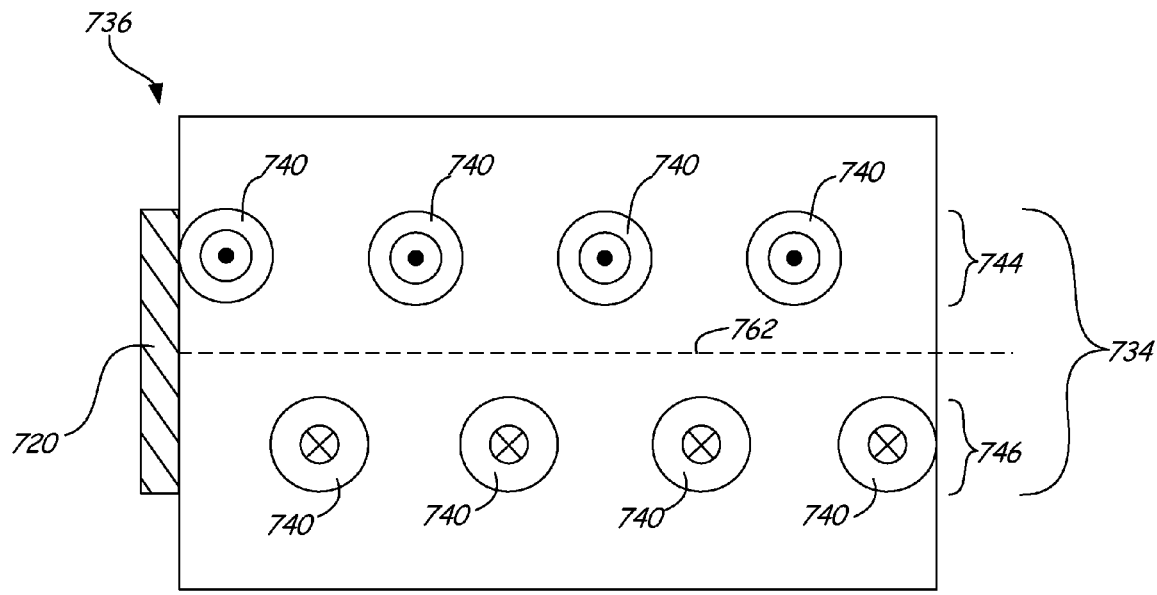
FIG. 10 illustrates a portion of a data sector that models a staggered pattern of bit patterned media.
Figures 1, 11:
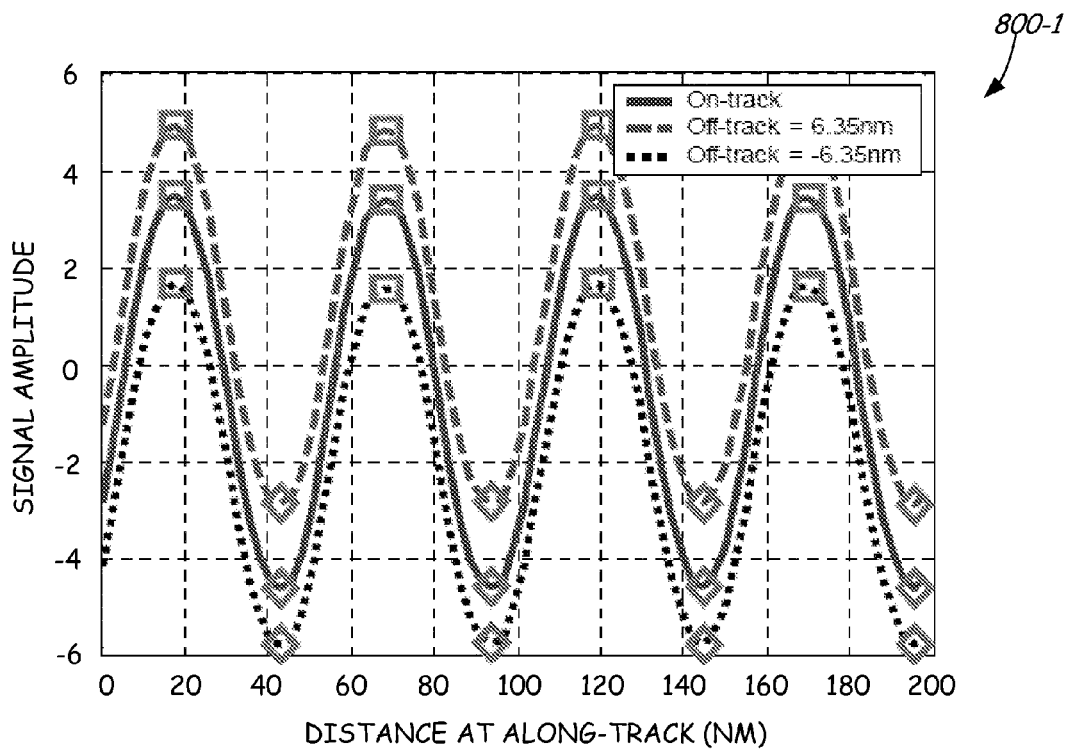
Figures 2, 11:
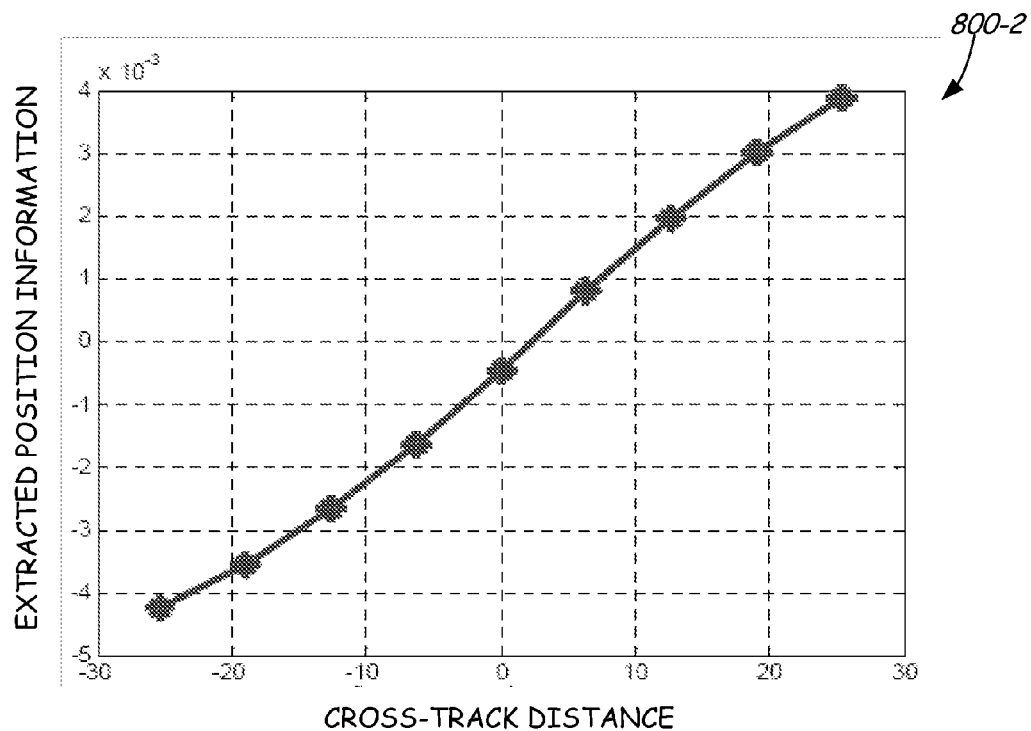

FIG. 10 illustrates a portion of a data sector 736 that models a staggered pattern of bit patterned media. Data sector 736 includes a first sub-track 744, a second sub-track 746 and a center 762 of the data track 734. FIG. 10 also illustrates the magnetization levels of bit islands 740. In the modeled data sector 736, an amount of redundant bits is chosen as 8 redundant bits as illustrated and the magnetic recording system uses the method of determining the position information of a transducer as discussed above and illustrated in FIGS. 6 and 7. The information written on bit islands 740 of the redundant bits is read back using a transducer 720. FIG. 11-1 is a plot 800-1 illustrating samples of the read back signals corresponding to the 8 redundant bits illustrated in FIG. 10 when transducer 720 is located at different off-track positions. FIG. 11-1 also illustrates the samples of the waveforms corresponding to first sub-track 744 and second sub-track 746. Square shaped data points in FIG. 11-1 correspond with samples of the read back signal from the first sub-track 744 and diamond shaped data points in FIG. 11-1 correspond with samples of the read back signal from the second sub-track 746. As illustrated, whenever transducer 720 moves to an off-track direction, the sample amplitudes shift based on the direction of the movement. Using the samples illustrated in FIG. 11-1, a plot 800-2 is illustrated in FIG. 11-2 that shows the extracted position information as a function of cross-track distance (or off-track amount).

It should be noted, FIG. 11-2 shows that the extracted position information is not exactly zero when the cross-track or off-track amount is zero. This deviation exists because of the transducer sensitivity function not being symmetric along the cross-track direction. This problem can be solved by optimizing the transducer 720 so that is has a more symmetric sensitivity function or by estimating the value of the position information at the center of the track 762 and subtracting the value from the extracted value assuming this non-zero constant bias does not change over time. It also should be noted that FIG. 11-2 shows that the extracted position information as a function of cross-track distance (or off-track amount) is not exactly linear. In accordance with conventional techniques, it is possible to implement a post-processing block to linearize this function.

Figure 12:
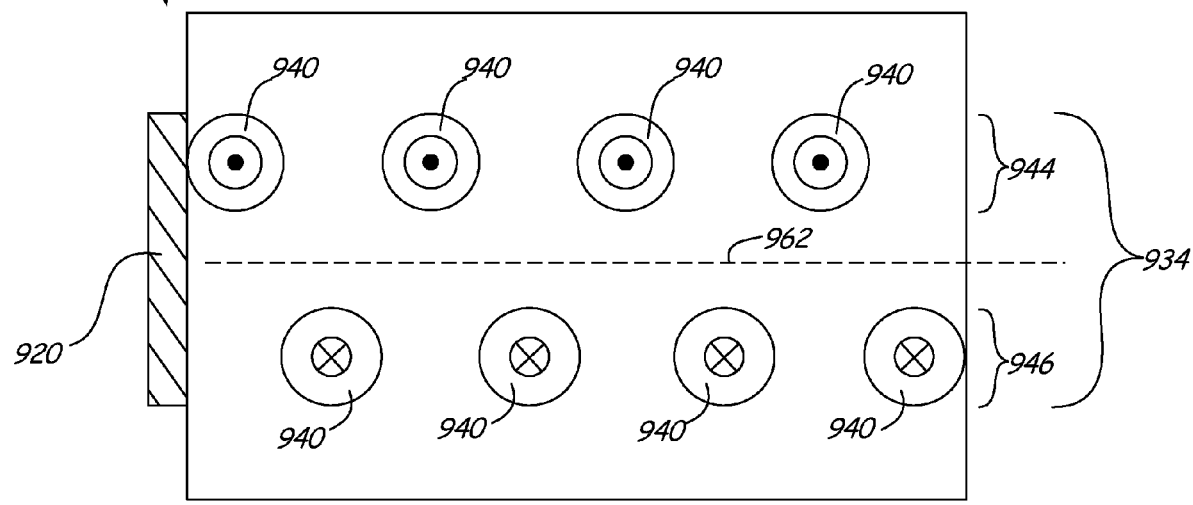
FIG. 12 illustrates a portion of a data sector that models a staggered pattern of bit patterned media.

FIGS. 11-1 and 11-2 did not consider noise effects. To analyze the effects of noise sources at different normalized densities (i.e., the amount of bit islands that a transducer can read at any given point along a track), FIG. 12 illustrates a portion of a data sector 936 that models a staggered pattern of bit islands 940 as squares. Data sector 936 includes a first sub-track 944, a second sub-track 946 and a center 962 of the data track 934. FIG. 12 also illustrates the magnetization levels of bit islands 940. In the modeled data sector 936, an amount of redundant bits are chosen. The information written on bit islands 940 of the redundant bits is read back using a transducer 920.

Figures 1, 13:
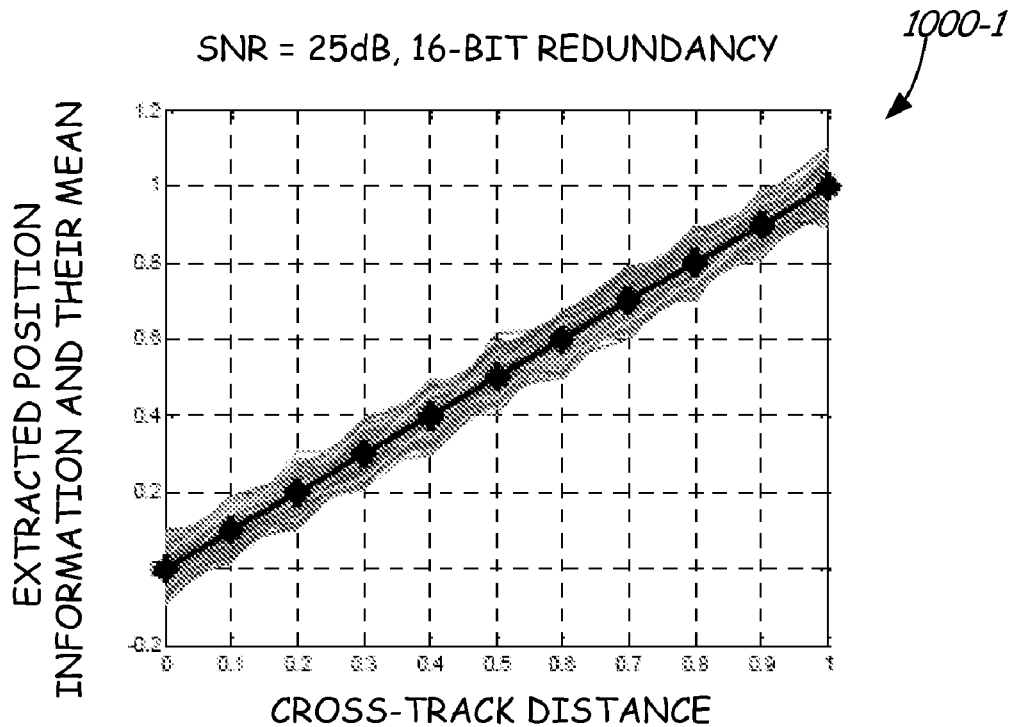
Figures 2, 13:
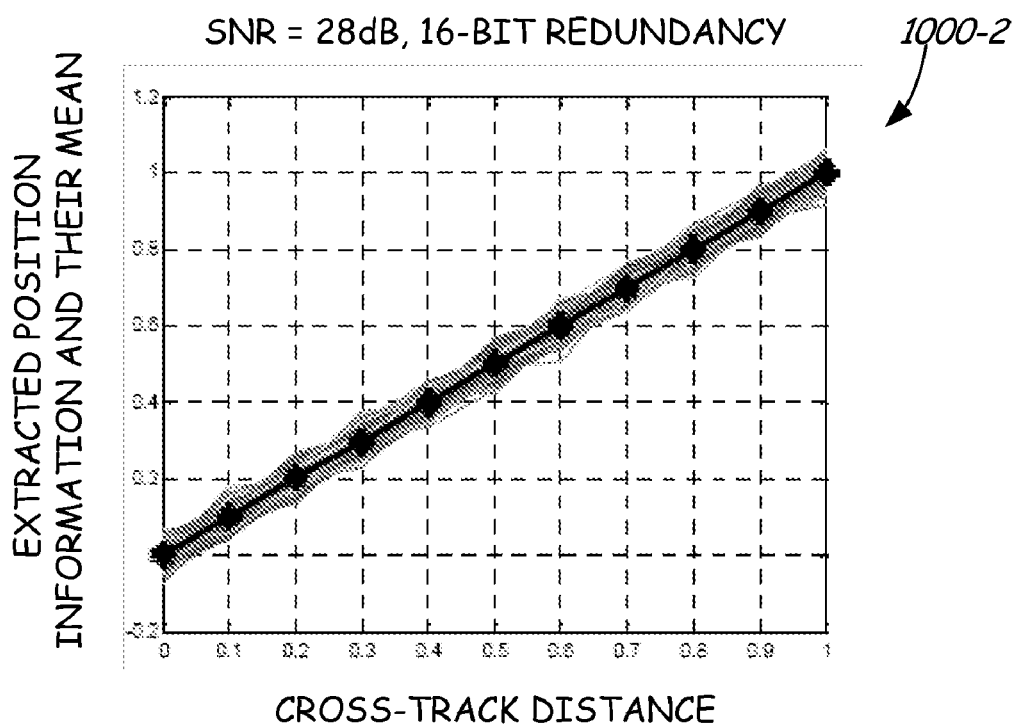
Figures 3, 13:
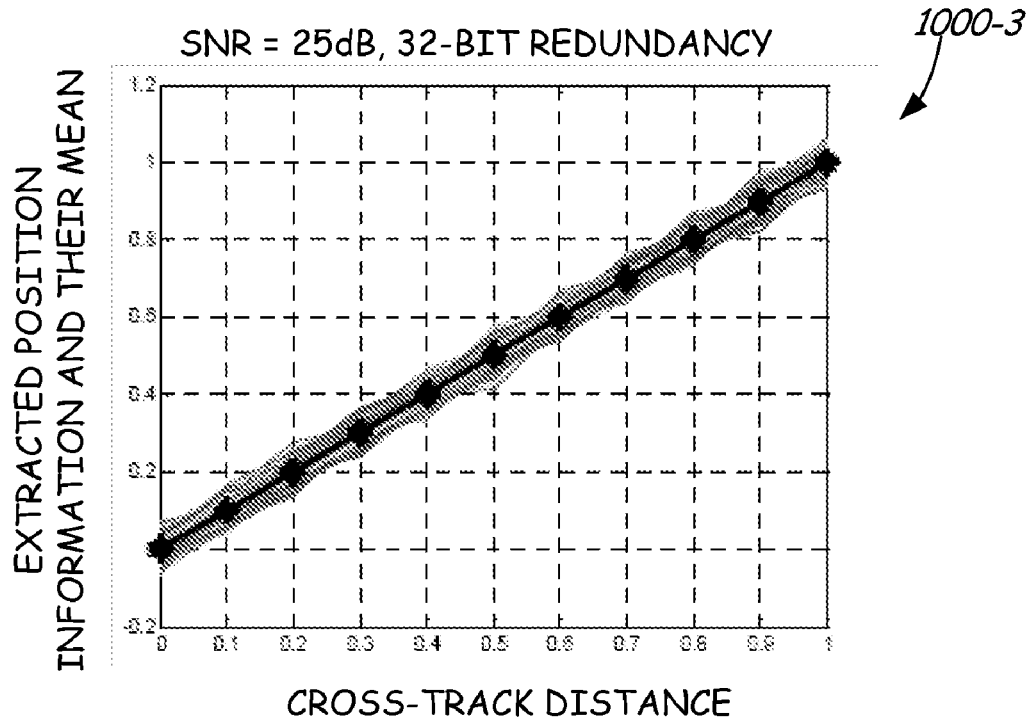
Figures 4, 13:
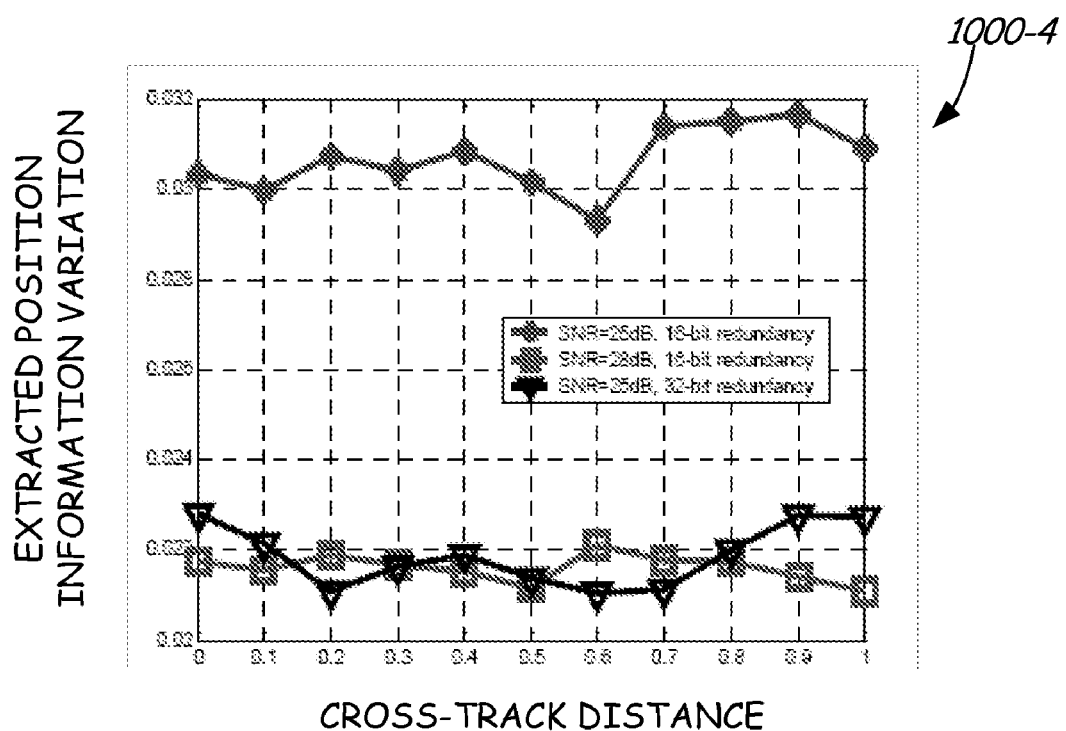

FIGS. 13-1 through 13-4 are plots illustrating extracted position information and their mean and variations (standard deviation) as a function of cross-track distance (or off-track amount) for different read elements having different sensitivities (i.e., signal-to-noise ratios, SNR), different chosen amounts of redundant bits and a normalized density of 2. In addition, the recording system uses the method of extracting positioning information of a transducer as discussed above and illustrated in FIGS. 6 and 7. FIG. 13-1 is a plot 1000-1 illustrating extracted position information and their mean as a function of cross-track distance for a SNR value of 25 dB and an amount of redundancy bits of 16. FIG. 13-2 is a plot 1000-2 illustrating extracted position information and their mean as a function of cross-track distance for a SNR value of 28 dB and an amount of redundancy bits of 16. FIG. 13-3 is a plot 1000-3 illustrating extracted position information and their mean as a function of cross-track distance for a SNR value of 25 dB and an amount of redundancy bits of 32. FIG. 13-4 is a plot 1000-4 illustrating extracted position information variation for the SNR values and the amounts of redundancy bits chosen for each of FIGS. 13-1 through 13-3.

The results gleaned from the plots illustrated in FIGS. 13-1 through 13-4 are different than the results gleaned from the plots illustrated in FIGS. 11-1 and 11-2. First, in FIGS. 13-1 through 13-4, the mean of the extracted position information is zero when the off-track amount is zero. This is shown because the read element sensitivity function is symmetric along the cross-track direction unlike that shown in FIGS. 11-1 and 11-2. The mean in FIGS. 13-1 through 13-4 also exhibits a linear dependency with respect to the off-track amount. Second, high sensitivity of the read element helps to reduce the standard deviation (or variation) of the extracted position information. Third, if the recording system does not have high read element sensitivity, then the standard deviation of the extracted position information can still be reduced by increasing the amount of redundancy bits. As shown in FIGS. 13-1 through 13-4, doubling the amount of redundancy bits gains 3 dB in sensitivity.

The embodiments described in the disclosure for improved transducer positioning for bit patterned media can be either used alone or can be combined with the existing RRO compensation methods within servo demodulator architecture using conventional media to improve system performance, robustness and/or cost. The embodiments described in the disclosure for improved transducer positioning for bit patterned media can also help relax the constraints on servo fields, especially servo burst fields and increase overall system throughput by reducing the number of re-reads and retries made by a transducer.

It is to be understood that even though numerous characteristics and advantages of various embodiments of the invention have been set forth in the foregoing description, together with details of the structure and function of various embodiments, this disclosure is illustrative only, and changes may be made in detail, especially in matters of structure and arrangement of parts within the principles of the disclosure to the full extent indicated by the broad general meaning of the terms in which the appended claims are expressed. For example, the particular elements may vary depending on the particular application for the data storage system while maintaining substantially the same functionality without departing from the scope and spirit of the present invention. In addition, although the preferred embodiment described herein is directed to a data storage system having a patterned media, it will be appreciated by those skilled in the art that the teachings of the present invention can be applied to other types of media, without departing from the scope and spirit of the present invention.

What is claimed is:

1. A method of determining position information of a transducer, the method comprising:
   choosing at least a first code and a second code, the first code having different characteristics than the second code;
   encoding user data written to a first sub-track with the first code and to a second sub-track with the second code;
   obtaining characteristics of the first code read from the first sub-track and characteristics of the second code read from the second sub-track; and
   extracting position information of the transducer from the obtained characteristics of the first code and obtained characteristics of the second code.

2. The method of claim 1, wherein choosing at least the first code and the second code such that the first code has different characteristics than the second code comprises choosing the first code and the second code such that the first code has different spectral shape properties than the second code.

3. The method of claim 1, wherein encoding user data written to the first sub-track with the first code and to the second sub-track with the second code comprises appending redundancy bits to one of an end of a data sector, a beginning of the data sector and between user data in the data sector of the first sub-track and the second sub-track.

4. The method of claim 1, wherein choosing a first code and a second code comprises:
   choosing an amount of redundancy bits to be appended to a data sector;
   setting a first portion of the redundancy bits to a first magnetic orientation; and
   setting a remaining portion of the redundancy bits to a second magnetic orientation that is different than the first magnetic orientation.

5. The method of claim 4, wherein encoding user data written to the first sub-track with the first code and to the second sub-track with the second code comprises:
   appending the first portion of the redundancy bits to the first sub-track; and
   appending the remaining portion of the redundancy bits to the second sub-track.

6. The method of claim 5, wherein extracting position information of the transducer comprises:
   summing the samples of the read signal from the first sub-track to obtain a first value;
   summing the samples of the read signal from the second sub-track to obtain a second value; and
   averaging the first value and the second value to estimate the position of the transducer relative to the first sub-track and the second sub-track.

7. The method of claim 4, wherein encoding user data written to the first sub-track with the first code and to the second sub-track with the second code comprises:
   appending a half of the first portion of the redundancy bits to the first sub-track;
   appending a remaining half of the first portion of the redundancy bits to the second sub-track;
   appending a half of the second portion of the redundancy bits to the first sub-track; and
   appending a remaining half of the second portion of the redundancy bits to the second sub-track.

8. The method of claim 7, wherein extracting position information of the transducer comprises:
   multiplying the samples of the read signal from the first sub-track by a first sequence;
   summing the multiplied samples of the read signal from the first sub-track to obtain a first value;
   multiplying the samples of the read signal from second sub-track by a second sequence;
   summing the multiplied samples of the read signal from the second sub-track to obtain a second value; and
   averaging the first value and the second value to estimate the position of the transducer relative to the first sub-track and the second sub-track.

9. The method of claim 1, further comprising:
   obtaining servo information from dedicated servo regions on the media; and combining the obtained servo information with the obtained characteristics of the first code and obtained characteristics of the second code to extract position information of the transducer.

10. A recording system comprising:
media including data tracks that store user data in data sectors, wherein each data track of each data sector includes at least a first sub-track and a second sub-track; and
a transducer configured to write user data having a first code to the first sub-track and to write user data having a second code to the second sub-track, the first code having a first spectrum and the second code having a second spectrum different from the first spectrum; and
a controller that positions the transducer based on a comparison between the first spectrum of the first code and the second spectrum of the second code when decoded.

11. The recording system of claim 10, further comprising a read/write channel having a write encoder configured to encode the first sub-track with the first code and to encode the second sub-track with the second code.

12. The recording system of claim 11, wherein the read/write channel further comprises a read signal processor configured to process a read signal to obtain the first spectrum of the first code from the first sub-track and the second spectrum of the second code from the second sub-track.

13. The recording system of claim 10, further comprising a position extractor configured to compare a read signal from the first spectrum of the first code and a read signal from the second spectrum of the second code to extract position information to be transmitted to the controller.

14. A method of positioning a transducer on a data track, the method comprising:
encoding user data with a first code that is written to a first sub-track, the first code having a first property;
encoding user data with a second code that is written to a second sub-track, the second code having a second property;
obtaining the first property from the first sub-track and the second property from the second sub-track; and
positioning the transducer at least substantially near a center of the data track by comparing the first property of the first code to the second property of the second code.

15. The method of claim 14, wherein the first property of the first code comprises a first spectrum and the second property of the second code comprises a second spectrum.

16. The method of claim 14, wherein encoding user data with a first code that is written to at least a portion of the first sub-track comprises:
appending a first portion of redundancy bits having a first magnetic orientation to the first sub-track; and
appending a remaining portion of redundancy bits having a second magnetic orientation different from the first magnetic orientation to the second sub-track.

17. The method of claim 16, wherein positioning the transducer at least substantially near a center of the data track comprises extracting position information by:
summing the samples of the read signal from the first sub-track to obtain a first value;
summing the samples of the read signal from the second sub-track to obtain a second value; and
averaging the first value and the second value to estimate the position of the transducer relative to the first sub-track and the second sub-track.

18. The method of claim 14, wherein encoding user data with a first code that is written to at least a portion of the first sub-track comprises:
appending a half of a first portion of redundancy bits to the first sub-track;
appending a remaining half of the first portion of the redundancy bits to the second sub-track;
appending a half of a second portion of the redundancy bits to the first sub-track; and
appending a remaining half of the second portion of the redundancy bits to the second sub-track.

19. The method of claim 14, further comprising:
obtaining servo information from dedicated servo regions on the media; and
combining the obtained servo information with the obtained characteristics of the first code and obtained characteristics of the second code to extract position information of the transducer.

* * * * *